United States Patent
Vandermeijden

(10) Patent No.: US 10,088,922 B2
(45) Date of Patent: Oct. 2, 2018

(54) SMART RESONATING PEN

(71) Applicant: Synaptics Incorporated, San Jose, CA (US)

(72) Inventor: Tom R. Vandermeijden, Los Gatos, CA (US)

(73) Assignee: Synaptics Incorporated, San Jose, CA (US)

( * ) Notice: Subject to any disclaimer, the term of this patent is extended or adjusted under 35 U.S.C. 154(b) by 19 days.

(21) Appl. No.: 14/752,681

(22) Filed: Jun. 26, 2015

(65) Prior Publication Data

US 2016/0147317 A1 May 26, 2016

Related U.S. Application Data

(63) Continuation-in-part of application No. 14/675,622, filed on Mar. 31, 2015.

(60) Provisional application No. 62/120,859, filed on Feb. 25, 2015, provisional application No. 62/085,135, filed on Nov. 26, 2014.

(51) Int. Cl.
*G06F 3/033* (2013.01)
*G06F 3/038* (2013.01)
*G06F 3/0354* (2013.01)
*G06F 3/046* (2006.01)

(52) U.S. Cl.
CPC ........ *G06F 3/0383* (2013.01); *G06F 3/03545* (2013.01); *G06F 3/046* (2013.01)

(58) Field of Classification Search
CPC ..... G06F 3/0383; G06F 3/03545; G06F 3/046
See application file for complete search history.

(56) References Cited

U.S. PATENT DOCUMENTS

| | | | |
|---|---|---|---|
| 5,023,408 A | 6/1991 | Murakami et al. | |
| 5,294,792 A * | 3/1994 | Lewis | G06F 3/03546 250/221 |
| 6,249,234 B1 | 6/2001 | Ely et al. | |
| 6,641,044 B2 | 11/2003 | Plesko | |
| 7,292,229 B2 * | 11/2007 | Morag | G06F 3/03545 178/18.07 |
| 7,406,393 B2 | 7/2008 | Ely et al. | |
| 8,773,404 B2 | 7/2014 | Wei et al. | |
| 2009/0251434 A1 | 10/2009 | Rimon et al. | |
| 2011/0122087 A1 | 5/2011 | Jang et al. | |
| 2011/0169756 A1 * | 7/2011 | Ogawa | G06F 3/03545 345/173 |
| 2011/0205191 A1 | 8/2011 | Hou et al. | |
| 2011/0267292 A1 | 11/2011 | Yeh | |
| 2012/0105361 A1 | 5/2012 | Kremin et al. | |

(Continued)

FOREIGN PATENT DOCUMENTS

WO 2014128712 A1 8/2014

*Primary Examiner* — Patrick Edouard
*Assistant Examiner* — Joseph Fox
(74) *Attorney, Agent, or Firm* — Ferguson Braswell Fraser Kubasta PC

(57) ABSTRACT

A resonating pen having multiple resonance frequencies includes a first circuit segment including an inductor for the resonance frequencies, a second circuit segment including transistors, where each of the transistors includes a transistor state, and a third circuit segment includes a controller. The controller is configured to alter the transistor state of the transistors to change the resonating pen to a resonance frequency. The resonating pen further includes a switch configured to control the controller.

20 Claims, 7 Drawing Sheets

(56) References Cited

U.S. PATENT DOCUMENTS

| | | |
|---|---|---|
| 2012/0242603 A1* | 9/2012 | Engelhardt ......... G06F 3/03545 345/173 |
| 2012/0313865 A1 | 12/2012 | Pearce |
| 2013/0155015 A1* | 6/2013 | Chang .................... G06F 3/044 345/174 |
| 2013/0342510 A1* | 12/2013 | Yeh ........................ G06F 3/038 345/179 |
| 2014/0104224 A1 | 4/2014 | In et al. |
| 2014/0132529 A1 | 5/2014 | Jeong |
| 2014/0160045 A1 | 6/2014 | Park et al. |
| 2014/0184245 A1 | 7/2014 | Hara et al. |
| 2014/0210781 A1* | 7/2014 | Stern ..................... G06F 1/3262 345/174 |
| 2014/0240298 A1* | 8/2014 | Stern ..................... G06F 3/0383 345/179 |
| 2015/0123923 A1 | 5/2015 | Stern |
| 2015/0153845 A1 | 6/2015 | Chang et al. |
| 2015/0199035 A1* | 7/2015 | Chang ................. G06F 3/03545 345/179 |
| 2015/0338933 A1 | 11/2015 | Holz et al. |
| 2016/0139732 A1 | 5/2016 | Takeda et al. |

\* cited by examiner

700 Example

| Passive Pen Resonance Frequency (718) | Input Device Transmission Frequency (720) | Detected Pattern (722) | Interpreted Data (724) | |
|---|---|---|---|---|
| Y<br>Y<br>Y<br>Y | W<br>X<br>[Y]<br>Z | Y | 10 | 702 Frame 0 |
| X<br>X<br>X<br>X | W<br>[X]<br>Y<br>Z | X | 01 | 704 Frame 1 |
| Y<br>Y<br>Y<br>Y | W<br>X<br>[Y]<br>Z | Y | 10 | 706 Frame 2 |
| X<br>X<br>X<br>X | W<br>[X]<br>Y<br>Z | X | 01 | 708 Frame 3 |
| Z<br>Z<br>Z<br>Z | W<br>X<br>Y<br>[Z] | Z | 11 | 710 Frame 4 |
| W<br>W<br>W<br>W | [W]<br>X<br>Y<br>Z | W | 00 | 712 Frame 5 |
| X<br>X<br>X<br>X | W<br>[X]<br>Y<br>Z | X | 01 | 714 Frame 6 |
| Z<br>Z<br>Z<br>Z | W<br>X<br>Y<br>[Z] | Z | 11 | 716 Frame 7 |

FIG. 7

Data Passively Transmitted and Detected = 1001100111000111 — 726

SMART RESONATING PEN

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, embodiments relate to a resonating pen having multiple resonance frequencies. The resonating pen includes a first circuit segment including an inductor for the resonance frequencies, a second circuit segment including transistors, where each of the transistors includes a transistor state, and a third circuit segment includes a controller. The controller is configured to alter the transistor state of the transistors to change the resonating pen to a resonance frequency. The resonating pen further includes a switch configured to control the controller.

In general, in one aspect, embodiments relate to a system including an input device configured to detect multiple resonance frequencies, and a resonating pen having the multiple resonance frequencies. The resonating pen includes a first circuit segment including an inductor for the resonance frequencies, a second circuit segment including transistors, each of the transistors including a transistor state, and a third circuit segment including a controller. The controller is configured to alter the transistor state of the transistors to change the resonating pen to a resonance frequency. The resonating pen further includes a switch configured to control the controller.

In general, in one aspect, embodiments relate to a resonating pen having a multiple resonance frequencies. The resonating pen includes a tip, a first circuit segment including an inductor for the multiple resonance frequencies, a second circuit segment including transistors, each of the plurality of transistors including a transistor state, a third circuit segment including a force sensor configured to detect a force on the tip to obtain a detected force, and a fourth circuit segment including a controller. The controller is configured to alter the transistor state of the transistors to change, based on the detected force, the resonating pen to a resonance frequency of the multiple resonance frequencies.

Other aspects of the invention will be apparent from the following description and the appended claims.

BRIEF DESCRIPTION OF DRAWINGS

The preferred exemplary embodiment of the present invention will hereinafter be described in conjunction with the appended drawings, where like designations denote like elements. Further, in the figures, three co-linear dots indicate that additional items of similar type to the preceding and/or succeeding items with respect to the dots may optionally exist.

FIG. 7 shows an example in accordance with one or more embodiments of the invention.

DETAILED DESCRIPTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. One or more embodiments are directed to a smart resonating pen. In particular, the smart resonating pen includes a controller configured to change the resonance frequency of the pen. The controller is connected to a power source. The current resonance frequency may be detected by an input device when the pen is present in a sensing region as an input object.

Figure 1:
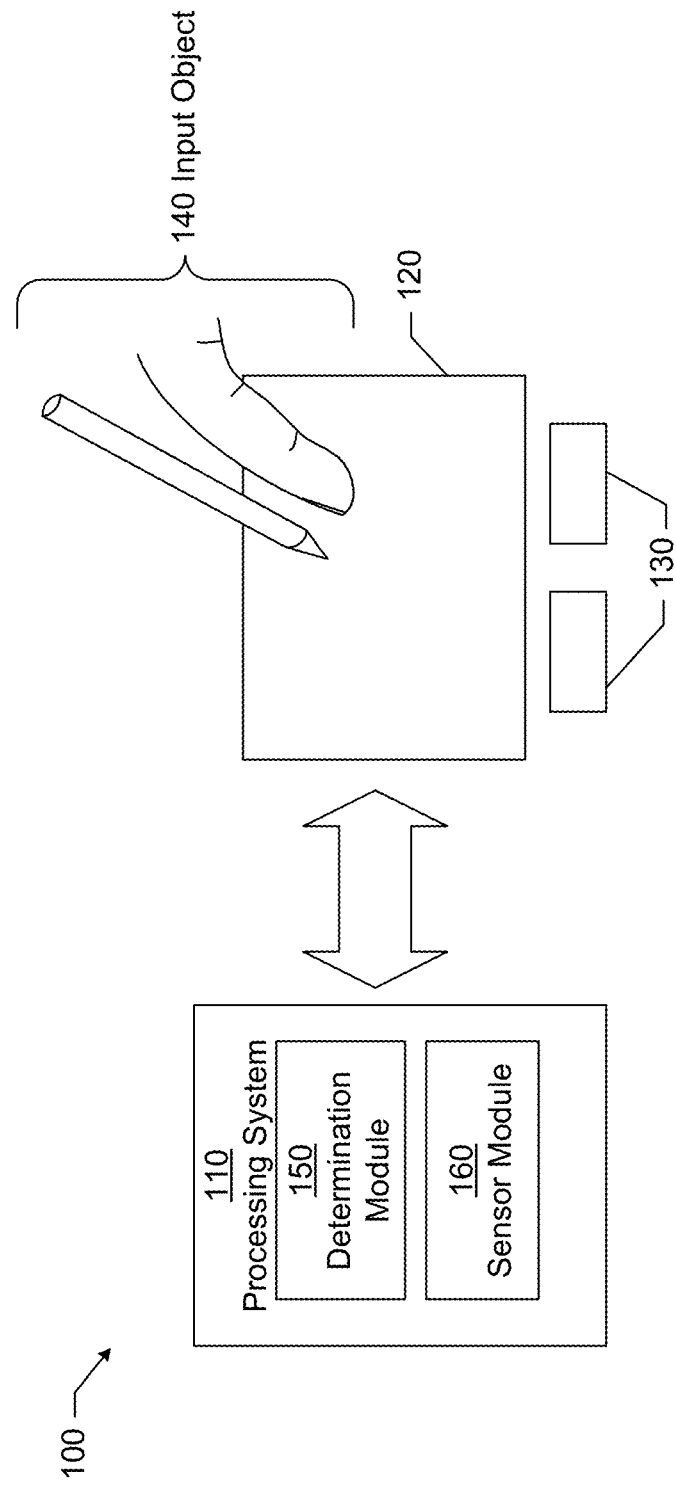
FIG. 1 is a block diagram of an example system that includes an input device in accordance with an embodiment of the invention.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object is used. Although the singular form is used, multiple input objects may exist in the sensing region (120). Further, which particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device (100), contact with an input surface (e.g. a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground. In some embodiments, transmitter sensor electrodes may both be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators, etc.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Although FIG. 1 shows only a determination module (150) and a sensor module (160), alternative or additional modules may exist in accordance with one or more embodiments of the invention. Such alternative or additional modules may correspond to distinct modules or sub-modules than one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments of the invention are described in the context of a fully-functioning apparatus, the mechanisms of the present invention are capable of being distributed as a program product (e.g., software) in a variety of forms. For example, the mechanisms of the present invention may be implemented and distributed as a software program on information-bearing media that are readable by electronic processors (e.g., non-transitory computer-readable and/or recordable/writable information bearing media that is readable by the processing system (110)). Additionally, the embodiments of the present invention apply equally regardless of the particular type of medium used to carry out the distribution. For example, software instructions in the form of computer readable program code to perform embodiments of the invention may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments of the invention may be implemented on a distributed system having several nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the invention. For example, various components may be combined to create a single component. As another example, the functionality performed by a single component may be performed by two or more components.

One or more embodiments are directed to at least one of the input objects (140) being a pen with an inductor in the sensing region. In one or more embodiments, the pen is a passive pen, or a pen that is not required to store energy for an extended period of time. For example, the amount of energy may be for one sensing cycle. According to some embodiments, a passive pen may receive power only through sensing signals driven on sensor electrodes of a capacitive sensing device. A passive pen is type of input object that is used on capacitive sensing devices. The passive pen interacts with a capacitive sensing device by affecting the measured capacitance of the sensing device. In other words, a passive pen interacts with the input device in a way similar to how a finger interacts with the input device. In contrast to an active pen that sends an electrical signal to an input device using an internal power source, a passive pen does not utilize active components to transmit a signal to the sensing device. Rather, the only input to the capacitive sensing device is based on the detection, by the capacitive sensing device, of the passive pen. Therefore, in contrast to an active pen, a passive pen does not typically include a battery or other power source for actively transmitting information. A passive pen may also be referred to as a passive stylus. While embodiments of the disclosed invention are primarily described for use with a passive pen, semi-passive pens that are charged by the sensing region and transmit using the charge and active pens may also be utilized.

Figure 2:
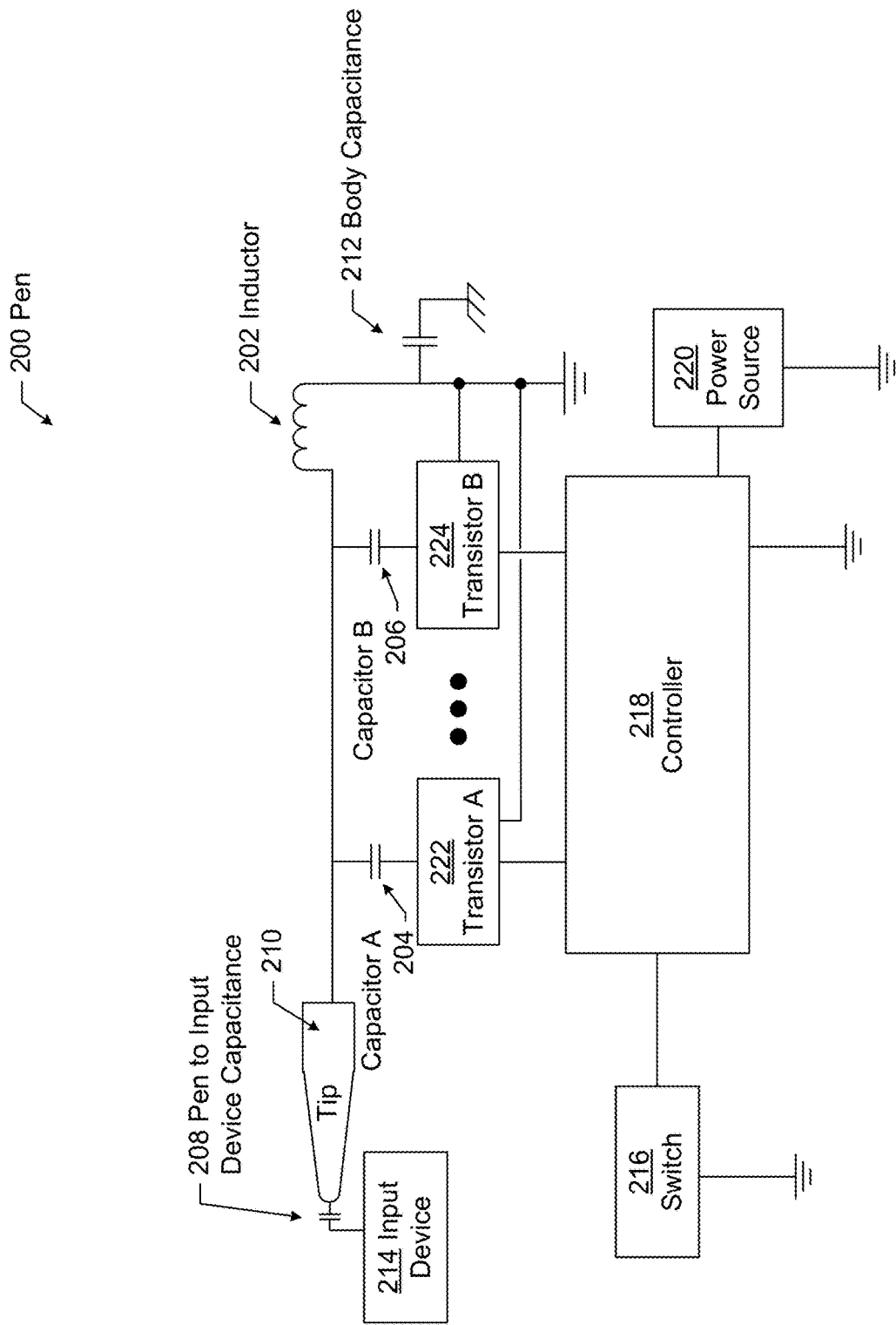
FIGS. 2, 3, 4, and 5 show circuit diagrams of a pen in accordance with one or more embodiments of the invention.

FIG. 2 shows an example circuit diagram of a pen (200) configured to resonate in multiple different frequencies in accordance with one or more embodiments of the invention. As shown in FIG. 2, the pen includes an inductor (202). The pen (200) may also have various capacitors (e.g., Capacitor A (204), Capacitor B (206)). Each capacitor (e.g., Capacitor A (204), Capacitor B (206)) may have different levels of capacitance. Further, the capacitor may be trim or variable capacitors and may be tunable, such as during manufacture or use. Although not shown, the pen may have parasitic resistance and parasitic capacitance. The parasitic resistance and parasitic capacitance may have various degrees of magnitude and may be accommodated during the tuning procedure. A capacitance (208) may also exist between the input device (shown in FIG. 1) and the pen. Further, a capacitance may also exist between a human user and the pen (shown as body capacitance (212)).

In one or more embodiments of the invention, by having the various capacitance in parallel with the inductor as shown in the circuit diagram of FIG. 2, the pen includes functionality to resonate at multiple different frequencies. Each of the multiple different frequencies may be substantially the same frequency as one of the possible driving waveforms of the sensor electrodes of the input device (214). In other words, the sensor electrodes coupled to the processing system are driven with sensing signals at defined frequencies. The pen is configured to have resonance frequencies that are substantially the same as the defined frequencies of the sensing signals. In other words, each resonance frequency is within a threshold distance of a defined frequency of the sensing signals. Thus, the effects of the pen in the sensing region are amplified when the pen has the substantially the same resonance frequency.

Continuing with FIG. 2, the pen (200) includes a tip (210), a switch (216), and a controller (218). The tip (210) is the portion of the pen that may contact the sensing region. In other words, through the tip (210), the measured capacitance of the sensing region may change.

The switch (216) is any type of switch that is configured to change the state of the controller (218). The switch (216) may be a mechanical switch, such as a button, rotary switch, slide switch, or any other type of switch. In one or more embodiments of the invention, the switch (216) is connected to controller (218). The controller (218) corresponds to logic that is configured to select one or more capacitors (e.g., Capacitor A (204), Capacitor B (206)) to be in parallel with the inductor (202). In other words, the controller (218) includes functionality to apply a voltage to a controller selected transistor (e.g., Transistor A (204), Transistor B (206)) that is connected to the corresponding capacitor. Because the controller (218) connects the capacitor in parallel with the inductor and the capacitors have different levels of capacitance, the selection of a particular capacitor changes the resonance frequency of the pen in accordance with one or more embodiments of the invention. The controller (218) may also be connected to power source (220). The power source (220) may include functionality to store energy and provide power to the controller (218). In at least some embodiments, the amount of power is sufficient only to power the controller (218) rather than transmit information. By way of an example, the power source may be a super capacitor. Further, the pen may include a solar cell that is configured to provide power to the power source.

As shown, the tip (210) is connected to the selected capacitor and the inductor (202) to cause the tip (210) to have a resonating frequency and be in a resonating state. The resonating state is when the pen resonates at a selected frequency, and the tip is connected to circuit having the inductor in parallel with the capacitor. In other words, when sensing signals are transmitted by sensor electrodes in the input device (214), the pen (200) resonates at the controller selected frequency based on the selected capacitor (e.g., Capacitor A (204), Capacitor B (206)). When away from the input device (214) or other such circuit, the pen (200) does not resonate. The input device (214) may detect when the sensing signals are at or are substantially near the resonance frequency of the pen based on the frequency of the transmitted signals and the measurement values acquired from resulting signals. By changing the resonance frequency, the pen may passively transmit information to the input device, and subsequently to the host device. In other words, rather than actively transmitting information, such as transmitting data packets in a particular frequency, the pen may include functionality to passively transmit information by changing the resonance frequency which is then recognized by the input device.

Although not shown in the configuration of FIG. 2, the pen may include circuit segments to be in a non-resonating state (not shown) even when in proximity of the input device. In particular, the tip (210) may not resonate and may be connected to the ground (214). In other words, in the resonating state, the inductor (202) is part of the circuit and causes the system to resonate. In the non-resonating state, the inductor is bypassed or shorted, and, thus, the pen does not resonate. Various mechanical elements may be used to switch the pen between the non-resonating state and the resonating state. In other embodiments, the pen may switch to a non-resonating state by altering the resonant frequency of the pen so that it is no longer substantially the same as the frequency of any of the sensing signals.

Figure 3:
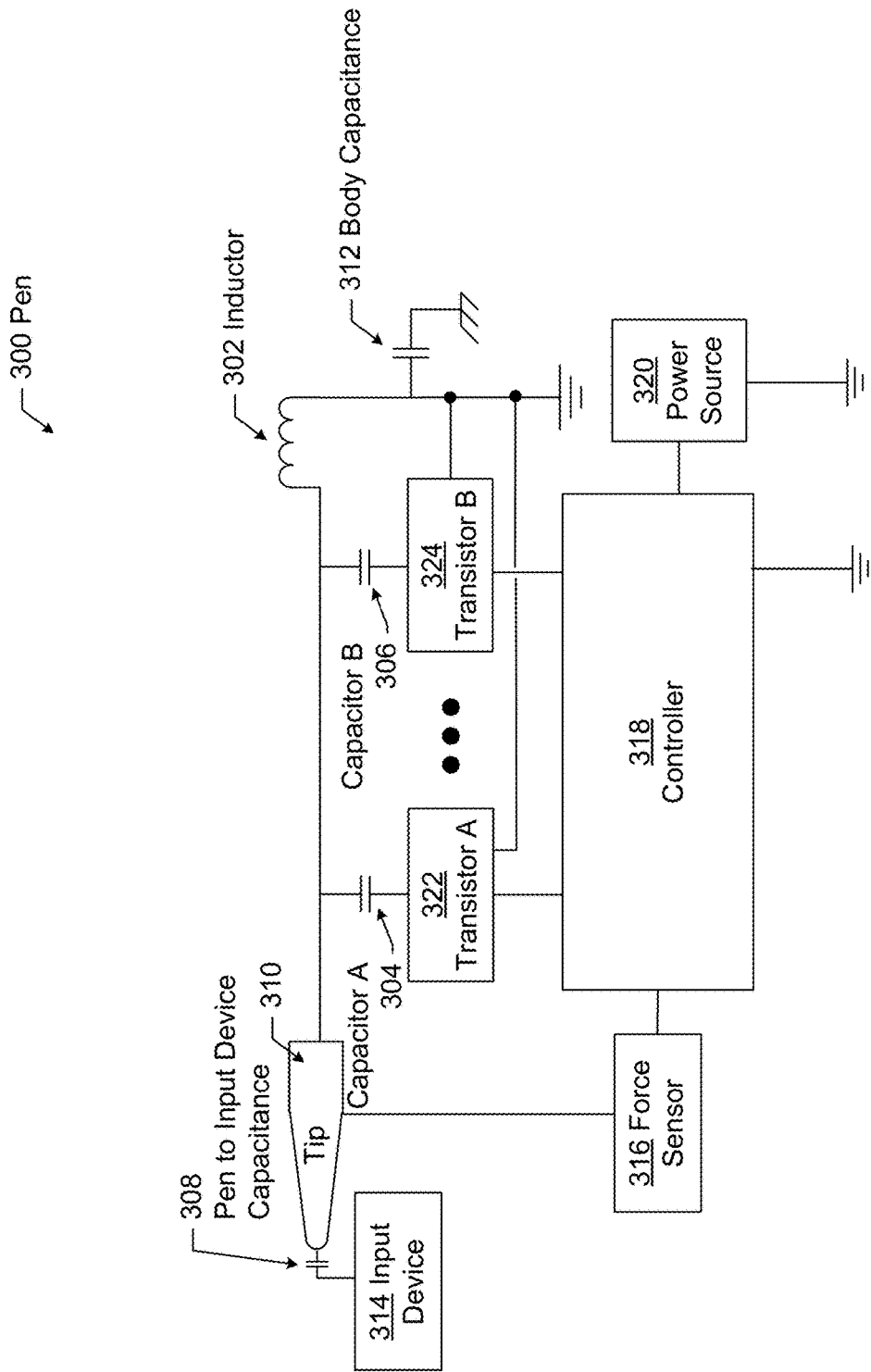

FIG. 3 shows another example circuit diagram of a pen (300) in accordance with one or more embodiments of the invention. In the example circuit diagram of FIG. 3, inductor (302), capacitors (e.g., Capacitor A (304), Capacitor B (306)), pen to input device capacitance (308), tip (310), body capacitance (312), input device (314), controller (318), power source (320), and transistors (e.g., transistor A (322), transistor B (324)) may be the same or similar to inductor (202), capacitors (e.g., Capacitor A (204), Capacitor B (206)), pen to input device capacitance (208), tip (210), body capacitance (212), input device (214), controller (218), power source (220), and transistors (e.g., transistor A (222), transistor B (224)), respectively, as shown in FIG. 2. In FIG. 3, a force sensor (316) is connected to tip (310) and controller (318). The force sensor (316) is configured to detect the force on the tip (310) and provide force information about the force to the controller (318). The controller (318) may be configured to select the resonance frequency or a series of resonance frequencies based on the force information. Using the resonance frequency or the series of resonance frequencies, the controller may communicate force information passively to the host as discussed above.

By way of an example, in one or more embodiments of the invention, a user may purposefully or unintentionally apply force to the tip when touching the tip to the surface of the input device. The amount of force may be detected by the force sensor on the pen, which changes the state of the controller. The controller may thereby communicate the force information by changing the resonance frequency to the input device.

Figure 4:
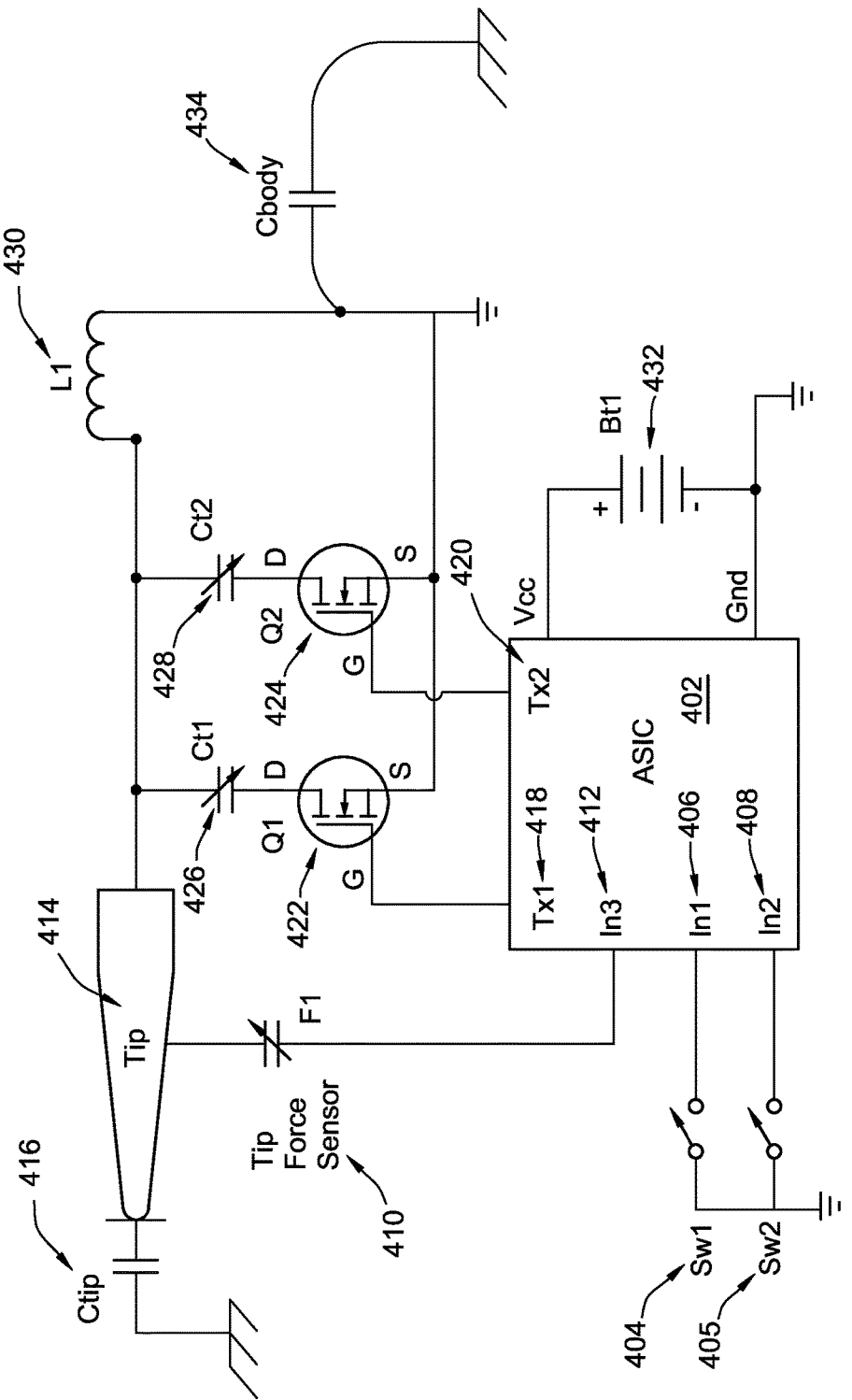

FIG. 4 shows an example circuit diagram of the pen (400) in accordance with one or more embodiments of the invention. In FIG. 4, the controller is an application specific integrated circuit (ASIC) (402). The pen (400) includes two switches (e.g., Sw1 (404), Sw2 (405)) which are connected to two separate inputs (e.g., In1 (406), In2 (408)) on the ASIC (402). A tip force sensor (410) is connected to a third input (e.g., In3 (412)). The tip force sensor (410) is also connected to the tip (414). Similar to FIG. 3, when the tip is within the sensing region and the input device is transmitting, a capacitance (416) may exist between the tip and the input device (shown as being grounded in FIG. 4).

Continuing with FIG. 4, the ASIC (402) may be connected to battery (e.g., Bt1 (432)) and may also include outputs, Tx1 (418) and Tx2 (420), for connecting to transistor Q1 (422) and transistor Q2 (424), respectfully. The transistors, Q1 (422) and Q2 (424), may each be connected to capacitors Ct1 (426) and Ct2 (428). Each transistor has a gate, drain, and source as denoted by the G, D, and S in FIG. 4. Similar to FIG. 2, when the transistor and corresponding capacitor is selected by ASIC (402), the capacitor is put in the circuit with inductor (430), causing the pen to resonate at a selected frequency. Because the capacitor has different levels of capacitance in one or more embodiments, the selection changes the resonance frequency of the pen. A capacitance (e.g., Cbody (434)) may also exist between the user and the pen (400). The various components of the pen shown in FIG. 4 may perform the same or similar operations as the like named components discussed above in reference to FIGS. 2 and 3.

In one or more embodiments of the invention, the ASIC (402) may include functionality to passively transmit information by selectively changing the resonance frequencies. For example, the input device and the ASIC may be configured, such as during manufacture, with a particular encoding that maps resonance frequencies or patterns of resonance frequencies to data. By way of a more specific example, the encoding may be that the resonance frequency corresponding to capacitor Ct1 (426) corresponds to a bit value of zero and the resonance frequency corresponding to capacitor Ct2 (428) corresponds to a bit value of one. By selectively changing resonance frequencies and the input device detecting the pattern of resonance frequencies, the ASIC may effectively passively communicate a particular string of bit values to the input device without performing a transmission of packets. In some embodiments, prior to transmission, the ASIC sends a synchronization signal that indicates to the input device that data is being transmitted. Accordingly, the ASIC may include functionality to receive information, map the information to the pattern of resonance frequencies based in the encoding, and select the corresponding transistor and capacitor to match the pattern. The input device includes functionality to detect the pattern and decode the information in order to detect the information being passively transmitted.

Various types of information may be transmitted. For example, the amount of force on the tip force sensor (410) may be determined by the ASIC (402) and transmitted as a pattern of resonance frequencies. As another example, information about the pen, such as serial number of the pen, may be encoded in a pattern and transmitted. Other information may be transmitted without departing from the scope of the invention.

Figure 5:
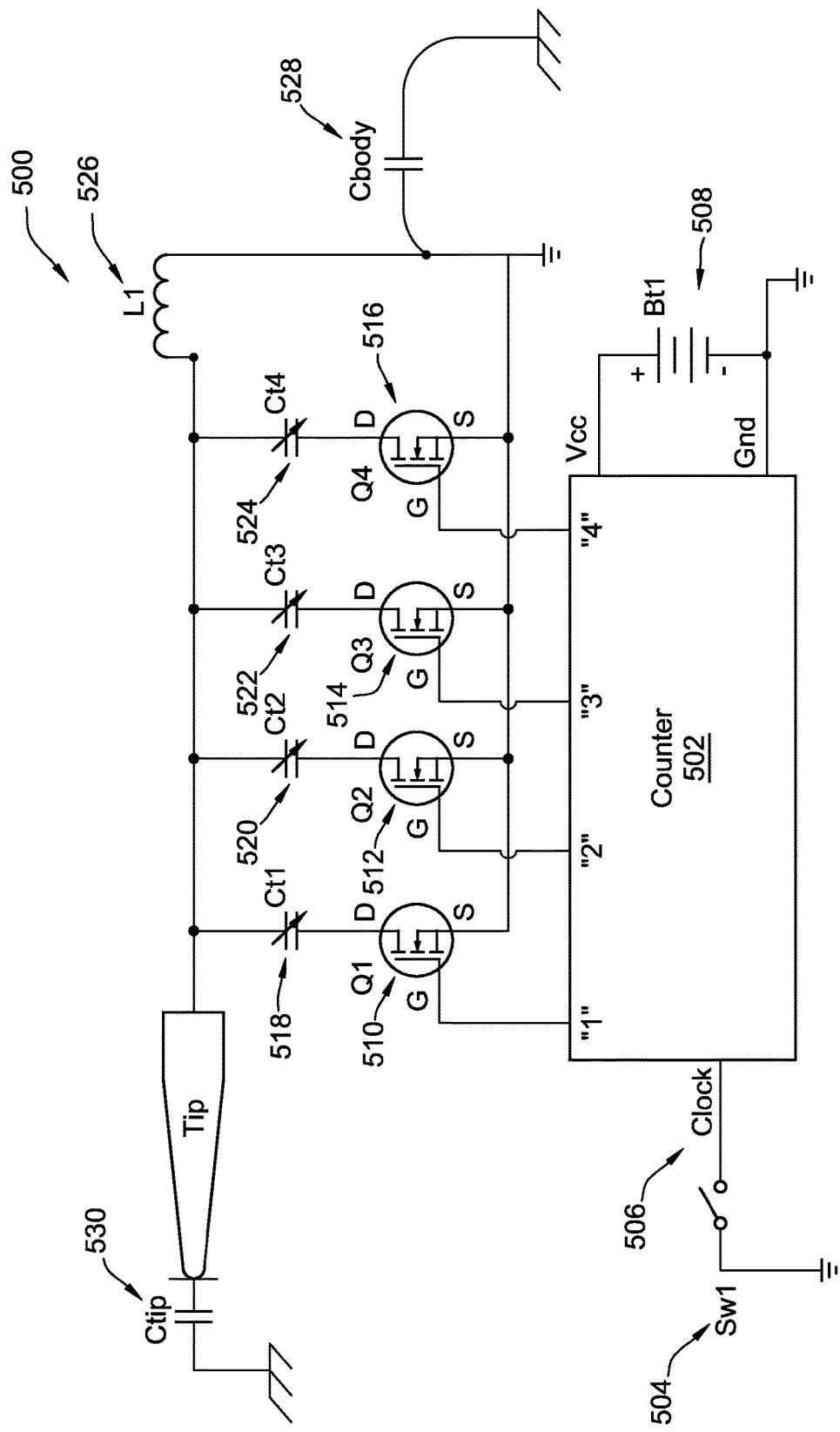

FIG. 5 shows an example circuit diagram of the pen (500) in accordance with one or more embodiments of the invention. In FIG. 5, the controller is a counter (502). The pen (500) includes a switch (e.g., Sw1 (504)) that is connected to a clock input (506) for the counter (502). In some embodiments, the counter is a standard complementary metal-oxide semiconductor (CMOS) part having a clock, outputs (e.g., 1, 2, 3, 4), and a reset (not shown). The counter (502) may be connected to battery (e.g., Bt1 (508)). The outputs of the counter (502) may each connect to a transistor (e.g., Q1 (510), Q2 (512), Q3 (514), Q4 (516)), which are each connected to corresponding capacitors (e.g., Ct1 (518), Ct2 (520), Ct3 (522), Ct4 (524)). Each transistor has a gate, drain, and source as denoted by the G, D, and S in FIG. 5. The capacitors may each have different levels of capacitance. Similar to FIG. 2, when the transistor and corresponding capacitor is selected by counter (502), the capacitor is put in the circuit with inductor (526), causing the pen to resonate at a selected frequency. Because the capacitors (518, 520, 522 and 524) have different levels of capacitance in one or more embodiments, the selection changes the resonance frequency of the pen. A capacitance (e.g., Cbody (528)) may also exist between the user and the pen (500). Similar to FIG. 3, when the tip is within the sensing region and the input device is transmitting, a capacitance (530) may exist between the tip and the input device (shown as being grounded in FIG. 5). The various components of the pen shown in FIG. 5 may perform the same or similar operations as the like named components discussed above in reference to FIGS. 2 and 3.

In one or more embodiments of the invention, the counter (502) may include functionality to switch between different output states. An output state is the activation of a particular output (e.g., 1, 2, 3, 4). In one or more embodiments of the invention, the counter (502) is configured to switch output states based on the selection of the switch (504). In other words, selection of the switch may cause the counter to change which transistor is selected by changing the output. The counter may also include a reset (not shown) that resets the counter to 1 when the counter is in output 4 and the switch is selected. The counter (502) may also include functionality to remain in the selected output state until the switch (504) is selected again.

In one or more embodiments of the invention, the switch (504) may be a non-latching switch or other switch that reverts back to a default position after selection. For example, the switch may be a button. Other types of switches may be included without departing from the scope of the invention.

Although FIGS. 2-5 show various configurations of components, other configurations may be used without departing from the scope of the invention. For example, more or fewer switches, transistors, and capacitors, may be present than shown in the Figures. Similarly, additional inductors may be included. Further, the same or a different switch may be present that may be configured to connect the tip to the ground in a manner that effectively removes the inductor from the circuit, and changes the pen to a non-resonating state.

Returning to FIG. 1, in one or more embodiments of the invention, the performance by the processing system may be partitioned into frames. Each frame represents a length of time to perform a single capture the state of the sensing region with respect to the existence of one or more input objects. The length of time may vary among frames. For example, if no input object is detected, the length of time may be shorter then when an input object is detected and additional processing is performed. In one or more embodiments of the invention, at the end of the frame, a report may be transmitted to other components of the processing system, input device, host system, or other device, or combination thereof. Each report includes positional information and frequency information regarding any input objects in the sensing region.

Figure 6:
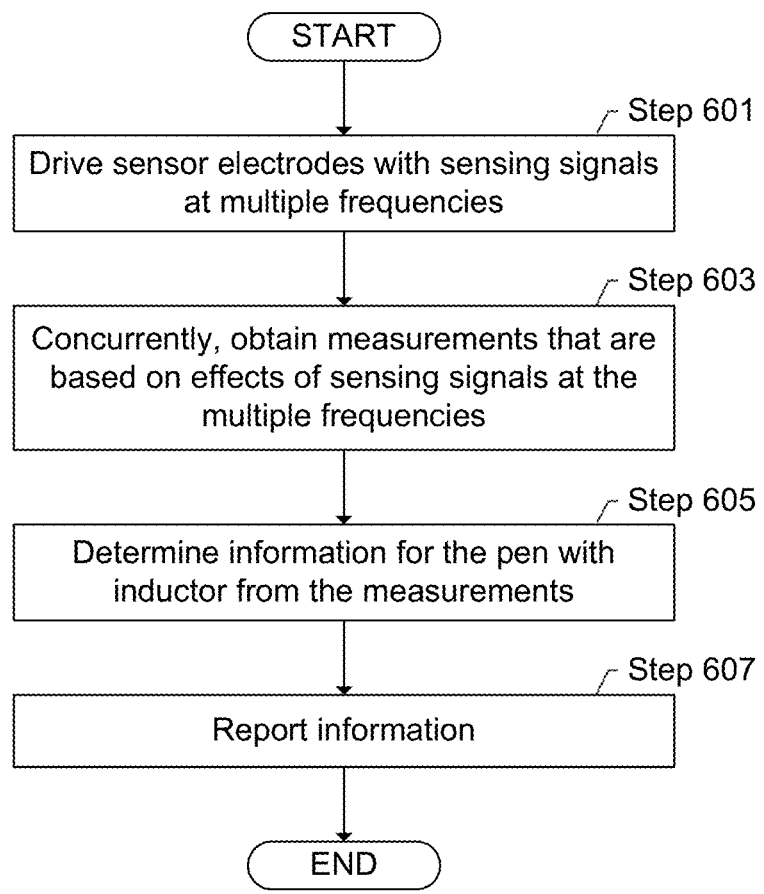
FIG. 6 shows a flowchart in accordance with one or more embodiments of the invention.

FIG. 6 shows a flowchart for the processing system to detect the resonating frequency or a pattern of resonating frequencies in accordance with one or more embodiments of the invention. FIG. 6 may be performed, for example, by the processing system using the determination module and sensor module shown in FIG. 1 in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

In Step 601, the sensor electrodes are driven with sensing signals at multiple frequencies. Concurrently, in Step 603, measurement values are determined based on the effects of the sensing signals at the multiple frequencies. When the pen is in the sensing region, the set of measurement values are based on effects of the pen in the sensing region and the sensing signals at the various frequencies. In one or more embodiments of the invention, mutual capacitance sensing is performed and the set of measurement values are the measured difference between received sensing signals and the transmitted sensing signals. Additionally or alternatively, absolute capacitive sensing may be performed and the measurement values measure the effects of the pen in the sensing region when sensing signals are transmitted at the selected frequency.

In one or more embodiments, transmitting sensing signals at multiple frequencies corresponds to each sensor electrode that transmits sensing signals, transmits substantially at each of the multiple possible resonance frequencies of the pen. In other words, each single sensor electrode that transmits, transmits at each of the multiple possible resonance frequencies at different times, thereby being distinct from frequency division multiplexing. However, frequency division multiplexing may be performed in conjunction with one or more embodiments without departing from the scope of the invention. The times may be interleaved for a single frame, performed in a round robin fashion, or performed in another manner.

For the following examples, consider the scenario in which the pen is configured to resonate at frequencies F1, F2, and F3. In an example, for a particular frame, the sensor electrodes are driven with sensing signals at frequency F1 and measurement values acquired, then driven with sensing signals at frequency F2 and measurement values acquired, and then driven with sensing signals at frequency F3 and measurement values acquired. In some embodiments, one or more frequencies may not be used when it is determined to be unnecessary. That is, driving at one or more sensing frequencies may be skipped if a resonant frequency has already been identified for a particular frame. For example, if the resonant frequency of an input object in the sensing region for a frame can be determined after driving sensing signals at frequency F1 and frequency F2, it may not be necessary to drive sensing signals at F3 for the frame. By way of another example, the driving of the sensor electrodes at the different frequencies may be interleaved during a single frame. In other words, during a single frame, one or more sensor electrodes may be driven at frequency F1, then F2, then F3, then F1, then F2, then F3, and so forth. Other example techniques may be performed to interleave the transmission at multiple frequencies without departing from the scope of the invention.

In Step 605, information for the pen with the inductor is determined from the measurements in accordance with one or more embodiments of the invention. For positional information, standard processing may be performed to determine the information for the pen. For resonance information, such as to identify the resonance frequency, a determination may be made whether the measurements in selected frequencies comply with a criterion. For example, in one or more embodiments of the invention, the criterion may be a pre-defined threshold for a peak magnitude of the measurement values at a particular frequency. In such embodiments, determining whether the measurement values satisfy a criterion includes identifying the peak magnitude and determining whether the peak magnitude is greater than the pre-defined threshold. In some embodiments, exceeding a threshold signal level indicates that the frequency of the driven sensing signals is substantially similar to the current resonant frequency of a pen in the sensing region.

By way of another example, the criterion may be based on a difference between measurement values at different frequencies. For example, a measurement value may be obtained for a first frequency and subtracted from the corresponding measurement value for a different frequency. If the difference for at least one measurement value exceeds a difference threshold, then the resonance frequency may be determined based on which measurement value is atypical from other measurement values.

By way of another example, measurement values for each particular frequency may be combined into a signal response level for the particular frequency. For example, the combination may be an average or other function. The combined measurement values may be across all measurement values or the measurement values only corresponding to the location of the detected input object. The signal response levels for different frequencies may be compared to identify the resonance frequency. In one or more embodiments, the signal response level for the resonance frequency may be negative whereas the other signal response levels are positive. In other embodiments, the signal response level for the resonance frequency may be an elevated level, whereas the other signal response levels are approximately equal. In such embodiments, a difference may be performed between each pair of signal response levels and a determination may be made whether the difference satisfies a threshold. If the difference satisfies the threshold, then the frequency corresponding to the elevated signal response level is determined to be the resonance frequency of the pen.

In accordance with one or more embodiments of the invention, the criterion may be matching a pattern of the measurement values in accordance with one or more embodiments of the invention. In one or more embodiments of the invention, when the pen is present in the sensing region, the selected frequency is near the resonance frequency, and mutual capacitance sensing is used, the measurement values may have a peak measurement and one or more tails extending from the peak measurement. A tail is a line of elevated or increased measurement values that extend from the position of the peak measurement and have progressively lower values from the peak measurement. When the pen is perpendicular to the surface of the input device, four tails may result from the sensing signals at the resonance frequency of the pen. When the pen is at an angle, the tail may be in the opposite direction of the heading direction of the pen. Thus, determining whether the measurement values satisfy the criterion may be performed by determining whether the relative magnitude of the measurement values with respect to each other satisfy a pattern having tails.

Other criteria may be used without departing from the scope of the invention. In one or more embodiments, the pen may be in a non-resonating state. If the pen is in a non-resonating state, the criterion for determining the resonating state of the pen is not satisfied. Thus, the pen is detected as being in the non-resonating state.

Regardless of the technique used to identify the current resonance frequency of the pen, the current resonance frequency may be combined with information about prior resonance frequencies in order to detect information being passively transmitted. For example, if the pen passively transmits a synchronization signal, such as by being in a predefined resonance frequency for a predefined length of time, the processing system may enter a pattern detection mode to start detecting a pattern of resonance frequencies and decode the pattern. In such a scenario, the processing system identifies the current resonance frequency of the pen, decodes the current resonance frequency to a bit value and adds the bit value to the prior detected resonance frequencies. If the processing system is not in a pattern detection mode, the processing system may be in a current frequency mode and only identify the current frequency to report.

Rather than the processing system being in a pattern detection mode or current frequency mode, the host or an application on the host may be in a pattern detection mode or current frequency mode. In such a scenario, the processing system may report only an indicator of the current resonance frequency.

In Step 607, positional information and frequency information is reported in accordance with one or more embodiments of the invention. In one or more embodiments, the positional information may be reported to the host. The frequency information reported may include the resonating state or non-resonating state of the pen. The frequency information may include information about the resonating frequency and/or information decoded from the detected pattern. For example, an identifier of the resonating frequency may be added to the frequency information. The identifier may be a frequency identifier in which the host may identify the frequency or an identifier of a switch state of the pen. For example, the identifier may be 1, 2, 3, or 4 if the pen has three resonating states and one non-resonating state. Other identifiers may be included without departing from the scope of the invention.

By being able to detect on multiple frequencies, the user may communicate additional information to the host via the pen, which is only detected by the input device rather than actively transmitted. For example, if the user is using a drawing application, the user may switch between different colors by changing the resonance frequency of the pen and having the input device detect the change. The host or application on the host may be configured to associate the identifier of the resonance frequency with the resulting action, such as the change in color. By way of other examples, the change in the resonance frequency may be used to request a display of a context menu, a change in active software application, select graphical user interface widgets versus move a cursor, or perform other actions.

The above are only a few embodiments of pens and describing how processing on multiple frequencies may be performed. The above embodiments may be combined and/or modified in virtually any manner to generate additional embodiments that are within the scope of the invention.

FIG. 7 shows an example (700) of passively transmitting information by a pen in accordance with one or more embodiments of the invention. In the example scenario, consider the scenario in which the pen stores a serial number that is used to unlock the user's phone. The example in FIG. 7 may use the pen shown in FIG. 4, but with four outputs, each connected to a distinct transistor, which is each connected to a corresponding capacitor. Thus, the pen is capable of resonating in one of four different resonance frequencies (e.g., W, X, Y, Z in FIG. 7) as selected by an ASIC. Further, for the purposes of the example, consider the scenario in which both the pen and the input device are configured such that W maps to bit values 00, Y maps to bit values 10, X maps to bit values 01, and Z maps to bit values 11. Additionally, for example purposes only, the serial number is a 16 bit string.

The example shown in FIG. 7 shows four columns, where each column has multiple rows. The rows are partitioned into frames. Each frame is the amount of time to detect the state of the sensing region and report the state of the sensing region. Thus, the temporal order, by processing and detection, of the frames are as follows from initial to last: frame 0 (702), frame 1 (704), frame 2 (706), frame 3 (708), frame 4 (710), frame 5 (712), frame 6 (714), and frame 7 (716).

In the example, the columns show the state of the corresponding component during the frame. Column 1 (718) shows the set resonance frequency of the pen as set by the ASIC on the pen. The ASIC determines that the serial number is 1001100111000111 as shown in box (726). Thus, the ASIC determines that the pattern is YXYXZWXZ. As shown in column 1 (718), the ASIC of the pen keeps the pen in a resonance frequency during the entire frame in order to ensure that the resonance frequency of the pen is detected. Thus, the pen is in resonance frequency Y during frame 0 (702), resonance frequency X during frame 1 (704), resonance frequency Y during frame 2 (706), resonance frequency X during frame 3 (708), resonance frequency Z during frame 4 (710), resonance frequency W during frame 5 (712), resonance frequency X during frame 6 (714), and resonance frequency Z during frame 7 (716).

Column 2 (720) shows the input device transmission frequency. As shown in column 2 (720), the input device transmits sensing signals on each of the possible resonance frequencies of the pen for each frame. In other words, the sensing signals are transmitted on each of resonance frequencies W, X, Y, and Z for frame 0 (702), on each of resonance frequencies W, X, Y, and Z for frame 1 (704), on each of resonance frequencies W, X, Y, and Z for frame 2 (706), and so forth. For each frame, the processing system receives resulting measurement values for each of the sensing signals in each of the resonance frequencies and processes the resulting measurement values to identify the resonance frequency of the pen.

Column 3 (722) shows the detected pattern that the processing system detects from determining the resulting measurement values. For example, the processing system may have used an elevated signal response level in order to determine the resonance frequency during a frame. Thus, as shown in column 3 (722), the processing system correctly detects the pattern that the pen is in resonance frequency Y during frame 0 (702), resonance frequency X during frame 1 (704), resonance frequency Y during frame 2 (706), resonance frequency X during frame 3 (708), resonance frequency Z during frame 4 (710), resonance frequency W during frame 5 (712), resonance frequency X during frame 6 (714), and resonance frequency Z during frame 7 (716).

While detecting the pattern, the processing system may decode the pattern as shown in column 4 (724) to obtain the corresponding bit values of 10 during frame 0 (702), 01 during frame 1 (704), 10 during frame 2 (706), 01 during frame 3 (708), 11 during frame 4 (710), 00 during frame 5 (712), 01 during frame 6 (714), and 11 during frame 7 (716). Thus, the processing system decodes the pattern of resonance frequencies to 1001100111000111 as denoted in box (726).

As shown in the example, rather than active transmission, one or more embodiments may be capable of passively transmitting information by changing a pattern of resonance frequencies, and changing the frequencies in which the sensing signals are transmitted.

Although not shown in the example, synchronization, such as sending a start signal by being in a resonance frequency, may be performed. Similarly, error correction may be performed to ensure that both the pen and the input device are synchronized with respect to the information. Further, at every predefined amount of frames, an additional synchronization may be performed. Additionally, a different encoding may be used. For example, rather than encoding the resonance frequencies, the change in resonance frequencies may be encoded. For example, a change from resonance frequency Y in Frame 0 to resonance frequency X in Frame 1 may map to bit values "00" in the encoding. Different encodings and different number of resonance frequencies may be used without departing from the scope of the invention.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A resonating pen having a plurality of resonance frequencies, the resonating pen comprising:
   a first circuit segment comprising an inductor for the plurality of resonance frequencies;
   a second circuit segment comprising a plurality of transistors, each of the plurality of transistors comprising a transistor state;
   a third circuit segment comprising a controller, the controller configured to alter the transistor state of the plurality of transistors to change the resonating pen to a first resonance frequency of the plurality of resonance frequencies; and
   a switch configured to trigger the controller to alter the transistor state of the plurality of transistors,
   wherein the resonating pen is configured to passively transmit a synchronization signal to an input device prior to transmitting data to the input device,
   wherein passively transmitting a synchronization signal comprises being, for a predefined length of time, in a second resonance frequency of the plurality of resonance frequencies, and
   wherein the resonating pen is a passive pen.

2. The resonating pen of claim 1, wherein the controller is an application specific integrated circuit (ASIC).

3. The resonating pen of claim 2, wherein:
   the input device is configured to:
      operate over a plurality frames, and
      drive at least one sensor electrode with signals having the plurality of resonance frequencies during each frame of the plurality of frames,
   the ASIC is configured to switch resonating frequencies automatically between frames by altering the transistor state of the plurality of transistors to encode information, and
   the input device is further configured to:
      detect the resonate frequency of the passive pen during each frame, and
      map each detected resonate frequency of the resonating pen to a bit value to decode the encoded information.

4. The resonating pen of claim 3, wherein the input device is further configured to add, in response to receiving the synchronization signal from the resonating pen, the bit value to a previous bit value associated with a previous frame.

5. The resonating pen of claim 1, wherein the controller is a counter.

6. The resonating pen of claim 1, wherein the resonating pen further comprises a power source configured to store energy for the controller.

7. The resonating pen of claim 6, wherein the resonating pen further comprises a solar cell for powering the power source.

8. The resonating pen of claim 6, wherein the power source comprises a super capacitor.

9. The resonating pen of claim 1, wherein the switch is configured to cycle through the plurality of resonance frequencies.

10. The resonating pen of claim 1, wherein the resonating pen comprises two buttons for enabling four resonance frequencies.

11. A system comprising:
   an input device configured to:
      detect a plurality of resonance frequencies, and
      enter a pattern detection mode in response to detecting a first resonance frequency of the plurality of resonance frequencies, wherein, in the pattern detection mode, the input device is configured to detect a pattern of resonance frequencies; and
   a resonating pen having the plurality of resonance frequencies, the resonating pen comprising:
      a first circuit segment comprising an inductor for the plurality of resonance frequencies,
      a second circuit segment comprising a plurality of transistors, each of the plurality of transistors comprising a transistor state,
      a third circuit segment comprising a controller, the controller configured to alter the transistor state of the plurality of transistors to change the resonating pen to a second resonance frequency of the plurality of resonance frequencies, and
      a switch configured to trigger the controller to alter the transistor state of the plurality of transistors,
      wherein the resonating pen is configured to passively transmit a synchronization signal to the input device prior to transmitting data to the input device, wherein passively transmitting a synchronization signal comprises being, for a predefined length of time, in the first resonance frequency of the plurality of resonance frequencies, and wherein the resonating pen is a passive pen.

12. The system of claim 11, wherein the resonating pen comprises two buttons for enabling four resonance frequencies.

13. The system of claim 11, wherein:

the input device is configured to:

operate over a plurality frames, and drive at least one sensor electrode with signals having the plurality of resonance frequencies during each frame of the plurality of frames, the controller is an ASIC configured to switch resonating frequencies automatically between frames by altering the transistor state of the plurality of transistors to encode information, and the input device is further configured to:

detect the resonate frequency of the passive pen during the frame, and map each detected resonate frequency of the resonating pen to a bit value to decode the encoded information.

14. The system of claim 13, wherein the input device is further configured to add, in response to receiving the synchronization signal from the resonating pen, the bit value to a previous bit value associated with a previous frame.

15. A resonating pen having a plurality of resonance frequencies, the resonating pen comprising:

a tip;

a first circuit segment comprising an inductor for the plurality of resonance frequencies;

a second circuit segment comprising a plurality of transistors, each of the plurality of transistors comprising a transistor state;

a third circuit segment comprising a force sensor configured to detect a force on the tip to obtain a detected force; and a fourth circuit segment comprising a controller, the controller configured to alter the transistor state of the plurality of transistors to change, based on the detected force, the resonating pen to a first resonance frequency of the plurality of resonance frequencies, wherein the resonating pen is configured to passively transmit a synchronization signal to the input device prior to transmitting data to the input device, wherein passively transmitting a synchronization signal comprises being, for a predefined length of time, in a second resonance frequency of the plurality of resonance frequencies, and wherein the resonating pen is a passive pen.

16. The resonating pen of claim 15, wherein the controller is an application specific integrated circuit (ASIC).

17. The resonating pen of claim 16, wherein the ASIC is configured to passively transmit force information of the detected force by changing between the plurality of resonance frequencies.

18. The resonating pen of claim 15, wherein the resonating pen further comprises a power source configured to store energy for the controller.

19. The resonating pen of claim 18, wherein the resonating pen further comprises a solar cell for powering the power source.

20. The resonating pen of claim 1, wherein the resonating pen comprises two buttons for enabling four resonance frequencies.

* * * * *

UNITED STATES PATENT AND TRADEMARK OFFICE
CERTIFICATE OF CORRECTION

Page 1 of 1

PATENT NO. : 10,088,922 B2
APPLICATION NO. : 14/752681
DATED : October 2, 2018
INVENTOR(S) : Tom R. Vandermeijden It is certified that error appears in the above-identified patent and that said Letters Patent is hereby corrected as shown below:

In the Claims

Claim 3, Column 18, Line 13, the word --of-- should be inserted between the words "plurality" and "frames".

Claim 13, Column 19, Line 14, the word --of-- should be inserted between the words "plurality" and "frames".

Signed and Sealed this
Eleventh Day of June, 2019

Andrei Iancu
*Director of the United States Patent and Trademark Office*